(12) United States Patent
Wang

(10) Patent No.: US 7,916,764 B2
(45) Date of Patent: Mar. 29, 2011

(54) OUTPUT POWER CONTROL FOR HARMONIC-GENERATING LASER

(75) Inventor: Charles Xiaoyi Wang, Fremont, CA (US)

(73) Assignee: Coherent, Inc., Santa Clara, CA (US)

( * ) Notice: Subject to any disclaimer, the term of this patent is extended or adjusted under 35 U.S.C. 154(b) by 83 days.

(21) Appl. No.: 11/586,987

(22) Filed: Oct. 25, 2006

(65) Prior Publication Data

US 2008/0101424 A1 May 1, 2008

(51) Int. Cl.
*H01S 3/10* (2006.01)
(52) U.S. Cl. .......................... 372/21; 372/20
(58) Field of Classification Search .............. 372/25, 372/22, 20, 21
See application file for complete search history.

(56) References Cited

U.S. PATENT DOCUMENTS

| | | | |
|---|---|---|---|
| 3,356,438 A | 12/1967 | Macek et al. ............... 350/150 |
| 3,786,367 A | 1/1974 | Shupe ....................... 331/94.5 |
| 4,194,168 A * | 3/1980 | Jarrett et al. ................ 372/94 |
| 4,272,734 A * | 6/1981 | Jarrett et al. ................ 372/32 |
| 5,063,566 A * | 11/1991 | Dixon ........................ 372/22 |
| 5,317,447 A * | 5/1994 | Baird et al. ................ 359/328 |
| 6,115,402 A * | 9/2000 | Caprara ..................... 372/101 |
| 6,414,980 B1 * | 7/2002 | Wang et al. .................. 372/92 |
| 6,527,849 B2 * | 3/2003 | Dry .......................... 106/677 |
| 6,678,431 B2 * | 1/2004 | Han et al. .................... 385/11 |
| 6,683,893 B2 | 1/2004 | Wang ......................... 372/10 |
| 6,940,880 B2 * | 9/2005 | Butterworth et al. ......... 372/22 |
| 7,079,557 B1 * | 7/2006 | Yin et al. .................... 372/22 |
| 7,130,321 B2 * | 10/2006 | Spinelli et al. ............... 372/22 |
| 7,170,921 B1 | 1/2007 | Freeman et al. ............ 372/106 |
| 7,254,153 B2 * | 8/2007 | Butterworth et al. ......... 372/94 |
| 7,518,711 B2 * | 4/2009 | Futami et al. .............. 356/73.1 |
| 7,529,281 B2 * | 5/2009 | Leonardo et al. ............ 372/22 |
| 2004/0001255 A1 | 1/2004 | Fratello .................... 359/484 |
| 2004/0262499 A1* | 12/2004 | Martinelli et al. ........... 250/225 |
| 2005/0068631 A1* | 3/2005 | Liu et al. ................... 359/618 |
| 2005/0084198 A1* | 4/2005 | Nagaeda et al. ............. 385/11 |
| 2005/0135454 A1 | 6/2005 | Wu et al. .................. 372/106 |
| 2006/0050747 A1 | 3/2006 | Trutna, Jr. et al. ............ 372/20 |
| 2006/0198402 A1 | 9/2006 | Hodgson et al. ............. 372/22 |
| 2008/0095210 A1* | 4/2008 | Murdoch et al. ............. 372/70 |

* cited by examiner

*Primary Examiner* — Minsun Harvey
*Assistant Examiner* — Tuan N. Nguyen
(74) *Attorney, Agent, or Firm* — Morrison & Foerster LLP

(57) ABSTRACT

In harmonic-generating laser apparatus, plane-polarized fundamental radiation of a laser is converted to harmonic radiation by an optically nonlinear crystal. The power of harmonic radiation generated by the apparatus is selectively varied by selectively rotating the plane of polarization of fundamental radiation entering the optically nonlinear crystal.

18 Claims, 4 Drawing Sheets

OUTPUT POWER CONTROL FOR HARMONIC-GENERATING LASER

TECHNICAL FIELD OF THE INVENTION

The present invention relates in general to varying and controlling output power of lasers. The invention relates in particular to varying and controlling the output power of lasers in which fundamental radiation is converted to harmonic output-radiation by an optically nonlinear crystal.

DISCUSSION OF BACKGROUND ART

In most laser applications it is desirable to be able to vary and control output power of the laser. This is true for lasers that deliver output radiation at a fundamental wavelength of a gain-medium of the laser and also true for lasers in which fundamental radiation is converted to second, third, fourth or even higher harmonic output radiation in one or more optically nonlinear crystals.

In the latter case it has been common practice to vary the harmonic output by varying the power of the fundamental radiation that is converted to harmonic radiation. The fundamental power is typically varied by varying energy (pump-power) delivered to the gain-medium for energizing the gain-medium. A problem with this method is that varying the pump-power usually varies thermal conditions of the gain-medium. In solid-state lasers a thermal condition that varies is thermal lensing. Variation of thermal lensing can cause transient effects including variations in beam quality. It is particularly the case for Q-switched and other pulsed, solid-state lasers.

Several methods have been proposed to minimize thermal lensing effects when varying output power in a solid state laser. Two such methods are described in U.S. Pat. No. 6,414,980, and in U.S. Pat. No. 6,683,893, each thereof assigned to the assignee of the present invention. In each case the methods are dependent on the mode of operation of a Q-switch controlling the pulse-repetition rate and the average output power of the laser. U.S. Pat. No. 6,115,402, also assigned to the assignee of the present invention, describes a method of compensating thermal lensing changes resulting from varying pump-light power by using a movable resonator mirror. While these methods are effective, they are not perfect. Generally, the bigger the range of power variation required, the less effective the method, at least over some transient period. There is a need for an alternative method for varying and controlling output-power in harmonic-generating lasers.

SUMMARY OF THE INVENTION

The present invention is directed to varying the output power of harmonic-generating laser apparatus including an optically nonlinear crystal arranged to receive plane-polarized radiation having a first wavelength and generate therefrom radiation having a second wavelength that is different from the first wavelength. In one aspect of the present invention, a method of selectively varying the power of second-wavelength radiation comprises selectively varying the orientation of the polarization-plane of the first-wavelength radiation with respect to the optically nonlinear crystal.

In another aspect, apparatus in accordance with the present invention comprises a laser resonator delivering plane-polarized laser radiation having a fundamental wavelength. At least one optically nonlinear crystal is arranged to generate radiation having a harmonic-wavelength of the fundamental radiation. A polarization-rotating device is provided for selectively varying the plane-of polarization of radiation entering the optically nonlinear crystal for varying the amount of harmonic-wavelength radiation generated thereby.

The second wavelength may be rational fraction of the first wavelength. The second wavelength may also have a wavelength longer than the first wavelength.

In one embodiment of the inventive apparatus the laser resonator is a Q-switched, pulsed laser resonator. There is only one optically nonlinear crystal and that crystal is arranged to generate second harmonic-radiation from the fundamental radiation. The selective polarization-rotating device is located between the laser resonator and the optically nonlinear crystal for rotating the plane of polarization of the fundamental-wavelength radiation. The polarization-rotating device is a half-wave plate selectively rotatable about the path of fundamental-wavelength radiation to the optically nonlinear crystal.

The harmonic power varying method of the present invention provides for more rapid and stable variation of harmonic output power compared with prior-art methods. The variation speed is limited primarily by the accuracy and speed of operation of the polarization-rotating device. There is minimal, if any, impact on other operating parameters of laser apparatus in which the method is embodied.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
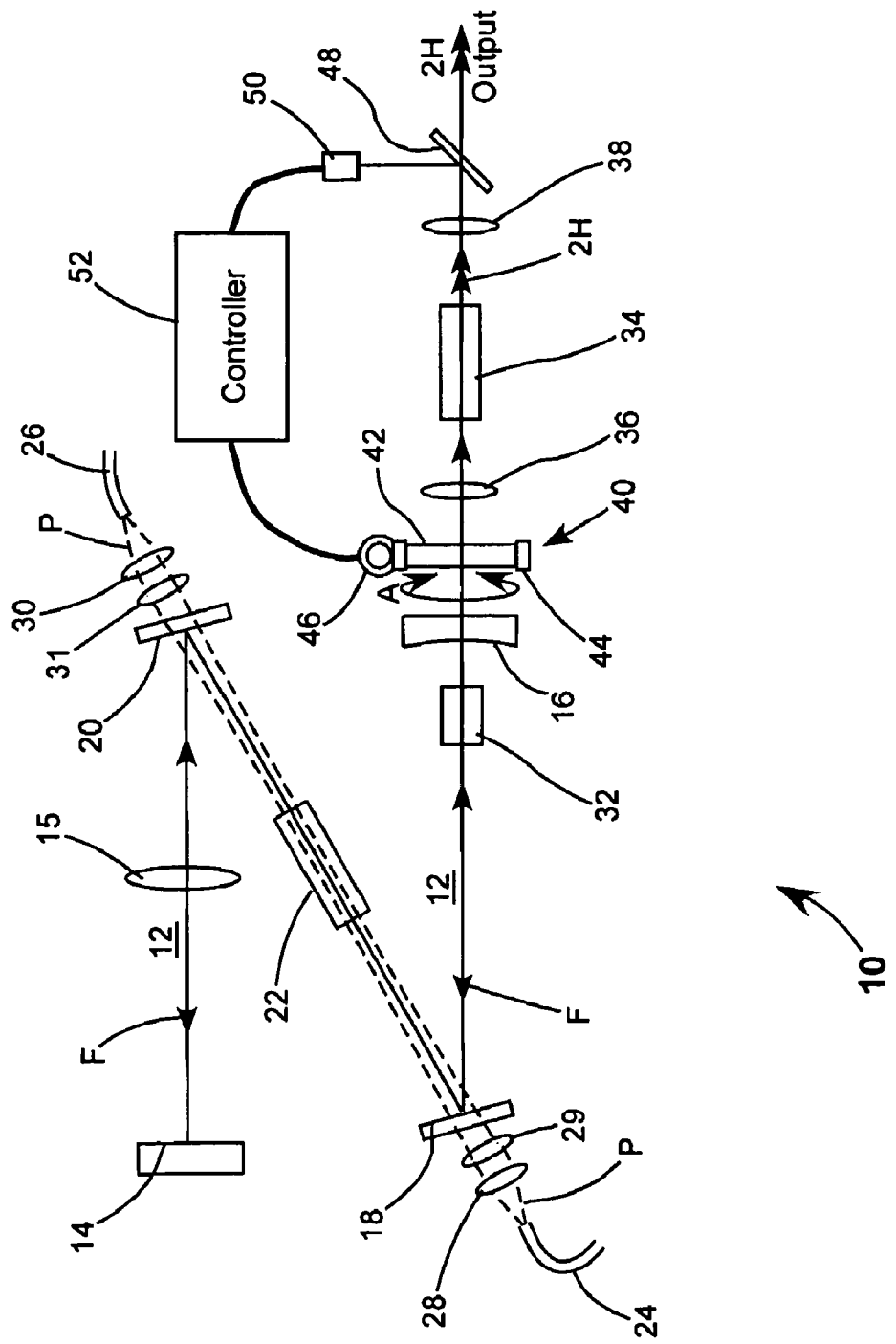
FIG. 1 schematically illustrates one preferred embodiment of a harmonic-generating laser in accordance with the present invention including a laser resonator delivering fundamental radiation to a first optically nonlinear crystal arranged to generate second-harmonic radiation from the fundamental radiation, and a variable polarization-rotator located between the laser resonator and the optically nonlinear crystal and rotatable for varying the second-harmonic output of the crystal.

Referring now to the drawings, wherein like components are designated by like reference numerals, FIG. 1 schematically illustrates a preferred embodiment 10 of harmonic-generating laser apparatus in accordance with the present invention. Apparatus 10 includes a folded linear standing-wave laser resonator 12 terminated by mirrors 14 and 16 and folded by fold mirrors 18 and 20. A solid-state gain-medium 22 is located in resonator 12 between fold-mirrors 16 and 20. A lens 15 provides for shaping the lasing mode. Gain-medium 22 is optically pumped by pump-light delivered by optical fiber bundles 24 and 26 from diode-laser arrays (not shown). The pump-light P is transmitted by the fold mirrors and focused into the gain-medium by lenses 28 and 29, and 30 and 31. The terminology "pump-light" is used herein for convenience of description and should not be construed as limiting the optical pumping to the use of visible radiation.

In one example of the inventive apparatus, gain-medium 22 is neodymium-doped yttrium vanadate ($Nd:YVO_4$). Optically pumping the gain-medium causes fundamental radiation F having a wavelength of about 1064 nanometers (nm) to circulate in resonator 12. A Q-switch 32 is used to cause pulsed operation of the resonator. Mirror 14 is highly reflective, for example, greater than 99% reflective at the fundamental wavelength. Mirrors 18 and 20 are highly reflective at the fundamental wavelength and transmissive at the wavelength of the optical pump radiation. Mirror 16 is partially reflective and partially transmissive at the fundamental wavelength and serves to couple fundamental radiation out of the resonator.

Fundamental radiation output from the resonator is plane-polarized in a plane determined by the orientation of the $YVO_4$ gain-medium. A portion of the fundamental output radiation is frequency-doubled by an optically nonlinear crystal 34 into second-harmonic radiation 2H. In the example considered here, wherein fundamental radiation has a wavelength of 1064 nm, the second-harmonic radiation has a wavelength of 532 nm. Optically nonlinear crystal 34 is preferably a lithium triborate (LBO) crystal cut for non-critical type-1 phase-matching at a predetermined temperature and for a predetermined polarization-orientation of fundamental radiation incident on the crystal. Fundamental radiation is focused by a lens 36 to a narrow waist within the crystal to increase the intensity of the fundamental radiation in the crystal and thereby increase the second-harmonic conversion (frequency-doubling) efficiency of the crystal. At the predetermined temperature and polarization the efficiency would be maximized for a particular intensity of fundamental radiation. Preferably the harmonic output from crystal 34 is collimated and shaped by a multi-element lens arrangement, represented in FIG. 1, for simplicity of illustration by a single lens element 38.

An assembly 40 provides for selectively variably rotating the plane of polarization output by resonator 12. Assembly 40 includes a quartz plate 42 configured to provide a maximum of 90 degrees rotation of the polarization-plane in a particular orientation of an input polarization-plane with respect to the crystal axes of the plate. This is usually termed a half-wave plate by practitioners of the art. Polarization-rotation caused by the plate can be varied by varying the orientation of the plate to the input polarization-plane by selectively rotating the plate about the direction of propagation of radiation as indicated in FIG. 1 by arrows A. The rotation angle of the polarization-plane is twice the rotation angle of the plate. In assembly 40, plate 42 is held in a holder 44 that can be rotated by a motor driven gear 46.

As the polarization-plane of fundamental radiation incident on crystal 34 is rotated from the optimum orientation, the frequency doubling efficiency of the crystal is reduced and the portion of fundamental radiation converted to second-harmonic radiation, i.e., the second-harmonic output of apparatus 10, is correspondingly reduced.

The second-harmonic output can be controlled at a desired level by sampling a portion of the second-harmonic output using a beamsplitter 48 to direct the sampled portion to a detector 50. The detector 50 is cooperative with a controller 52 which is cooperative with the driving means (not explicitly shown) for gear 46 to adjust the rotation of plate 42 to adjust the second-harmonic output to a pre-set level. Alternatively, the orientation of plate 42 can be set incrementally, manually or automatically, for a predetermined output power, again, without varying and controlling the pump-power delivered to gain-medium 22.

Figure 2:
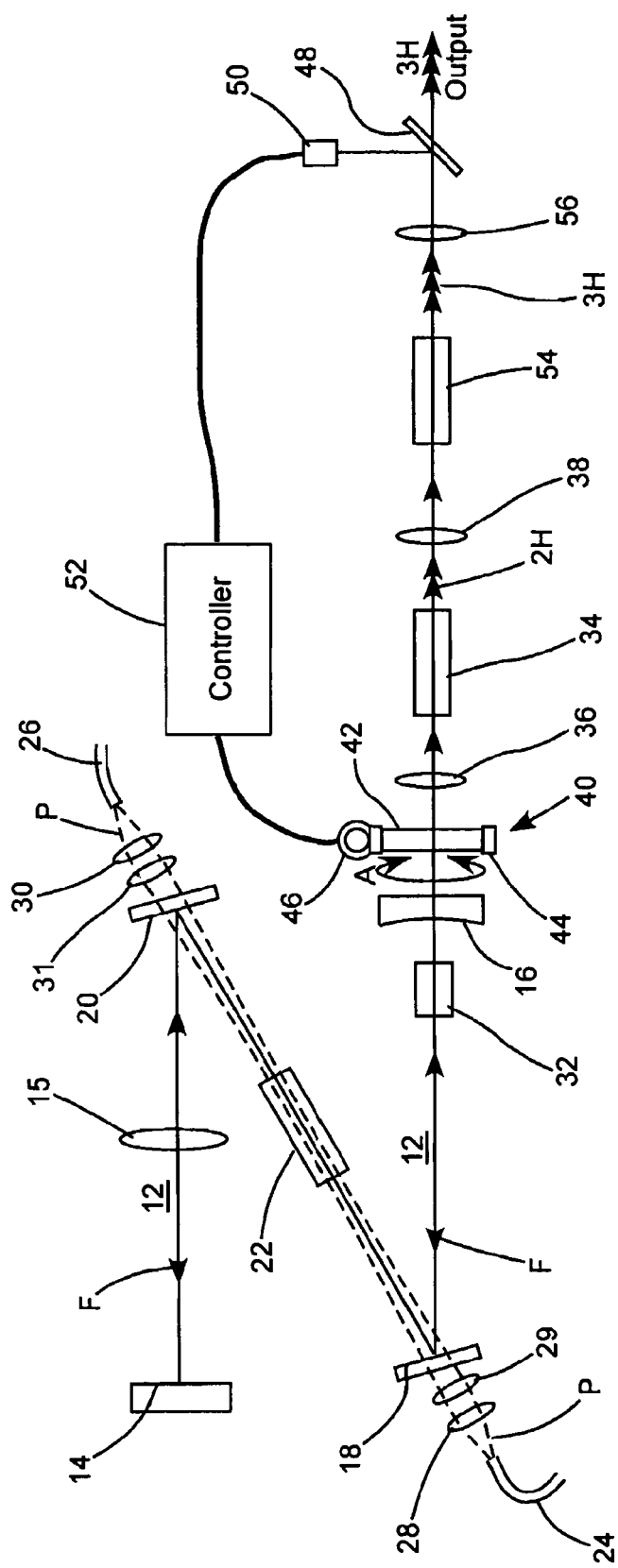
FIG. 2 schematically illustrates another preferred embodiment of a harmonic generating laser in accordance with the present invention, similar to the laser of FIG. 1 but further including a second optically nonlinear crystal arranged to mix the second harmonic output and fundamental radiation from the first optically nonlinear crystal to provide third-harmonic radiation.

FIG. 2 schematically illustrates another preferred embodiment 11 of laser apparatus in accordance with the present invention. Apparatus 11 is similar to apparatus 10 of FIG. 1 with an exception that an additional optically nonlinear crystal 54 (preferably LBO) is included and arranged for type-2 sum-frequency mixing of second-harmonic output and residual (unconverted) fundamental radiation from crystal 34 to provide radiation having the third-harmonic (3H) wavelength of the fundamental radiation. In this case lens 38 is configured to focus 2H and fundamental radiation into optically nonlinear crystal 34 and another lens 56 is provided for collimating the 3H output.

The third harmonic output of crystal 54 will be dependent, inter alia, on the second-harmonic input which is controlled by polarization rotating assembly 40 as in apparatus 10. If the second-harmonic output is properly optimized, then the third-harmonic input will be maximized, all else being equal. The term "properly optimized" as used here recognizes that maximum 3H output from crystal 54 may be obtained with less than maximum 2H output from crystal 34. However, if there is no second-harmonic output from crystal 34 there will be no third-harmonic output from crystal 34. In apparatus 11 beamsplitter 48 and detector 50 sample the third-harmonic output of crystal 54 and use that sampling to control the polarization-orientation of the fundamental radiation entering crystal 34 and accordingly the amount of second harmonic radiation delivered to crystal 54.

Those skilled in the art will recognize without further detailed explanation or illustration that variable polarization rotating assembly 40 could be located between crystal 34 and 54, instead of being located between the resonator and crystal 34. This could be used to selectively change the polarization orientations of 2H and fundamental radiation with respect to crystal axes of crystal 54, and with respect to each other, and thereby selectively change the 3H-output of crystal 54.

Figure 3:
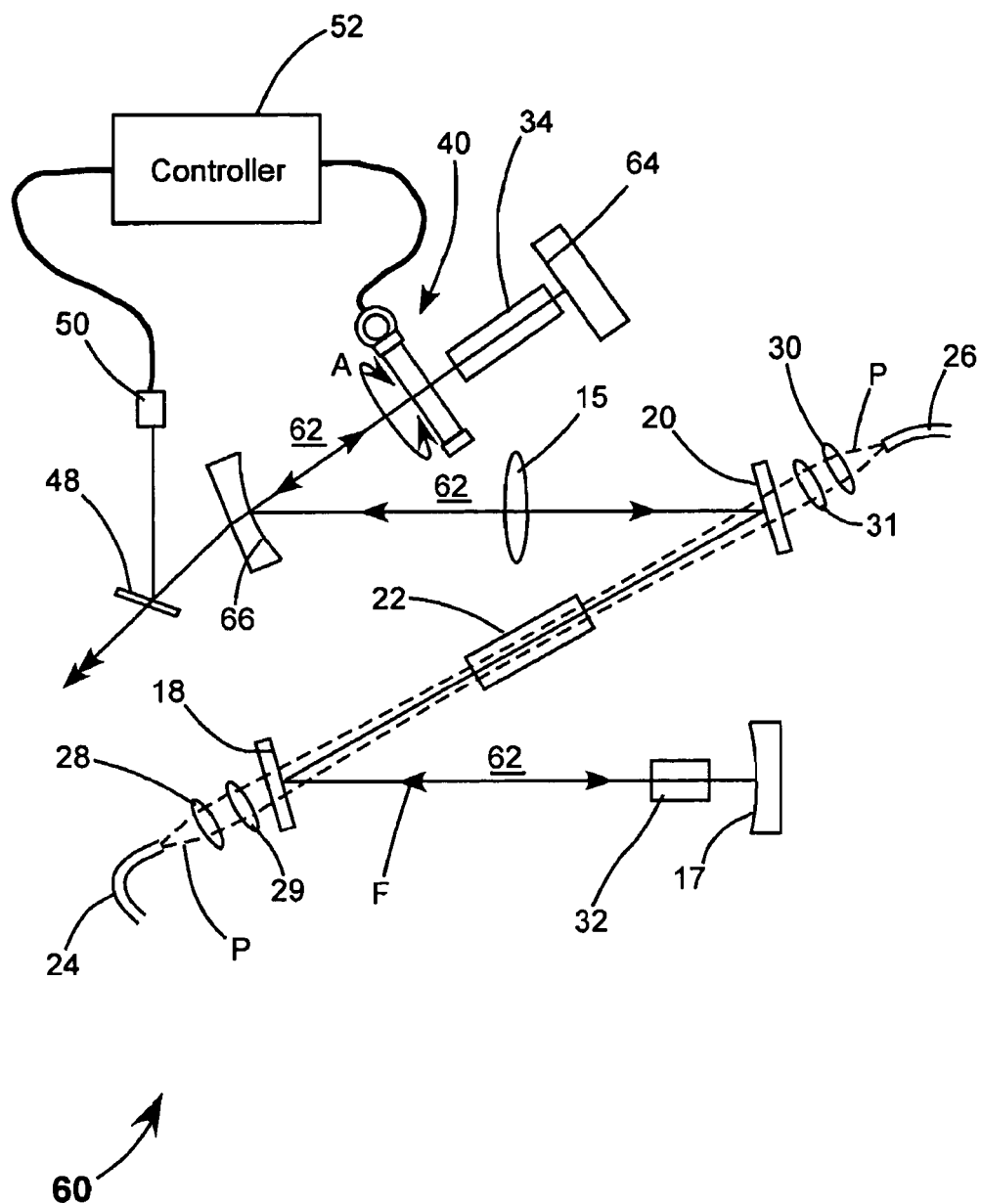
FIG. 3 schematically illustrates yet another preferred embodiment of a harmonic-generating laser in accordance with the present invention including a folded standing-wave linear laser resonator generating fundamental radiation, the resonator having a nonlinear crystal therein arranged to generate second-harmonic radiation from the fundamental radiation, and a variable polarization-rotator located in the laser resonator between a mirror of the laser resonator and the optically nonlinear crystal and rotatable for varying the second-harmonic output of the crystal.

The present invention is described above with reference to embodiments of the invention in extra-cavity frequency-converted lasers. The invention is also applicable to intra-cavity frequency-converted lasers. FIG. 3 schematically illustrates yet another embodiment 60 of laser apparatus in accordance with the present invention in which an optically nonlinear crystal 34 is arranged in a laser resonator 62 for frequency-doubling fundamental laser radiation generated in the resonator. Resonator 62 is terminated by mirrors 64 and 17 each thereof being highly reflective for the fundamental radiation of the resonator. Mirror 64 is also highly reflective for second-harmonic radiation generated by crystal 34.

Resonator 62 is folded into four arms by mirrors 18, 20, and 66. Fundamental radiation is generated by a solid-state gain-medium 22 located between mirrors 18 and 20, and end-pumped as described above for lasers 10 and 11 by pump-light P focused through mirrors 18 and 20. A Q-switch 32 provides for pulsed operation of the resonator and a lens 15 is included for mode-shaping. Crystal 34 is located in an arm of the resonator between mirror 66 and mirror 64. Mirror 66 is a concave mirror and mirror 64 is at a focus of mirror 66. Mirror 66 is highly reflective for fundamental radiation F and highly transmissive for 2H radiation and serves to deliver 2H radiation out of the resonator. Variable polarization-rotating arrangement 40 is located between crystal 34 and mirror 66. 2H-output of the laser is monitored by sampling the output using beamsplitter 48 and detector 50 cooperative with controller as described above with reference to lasers 10 and 11.

Figure 4:
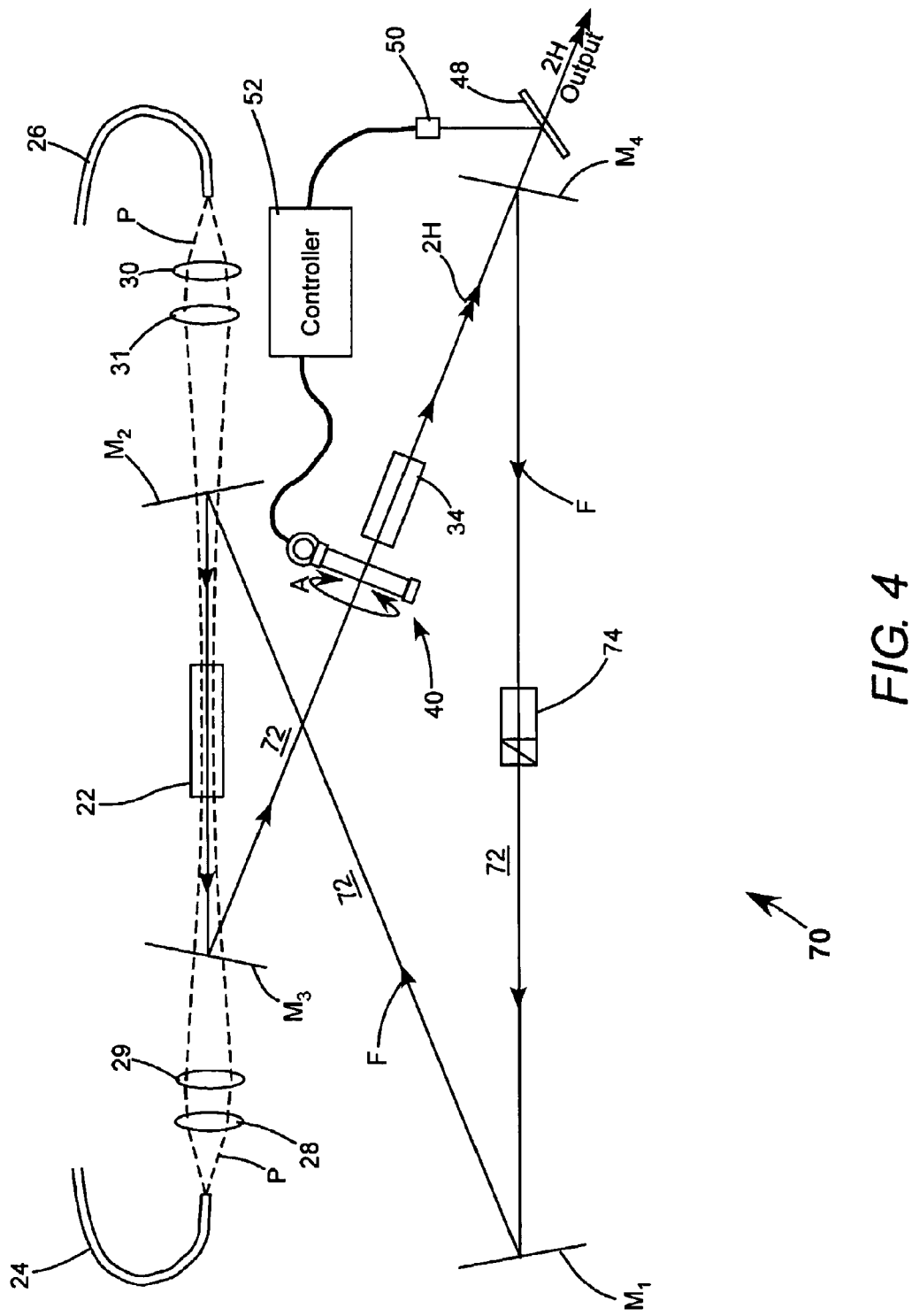
FIG. 4 schematically illustrates still another preferred embodiment of a harmonic-generating laser in accordance with the present invention including a traveling-wave ring-laser resonator generating fundamental radiation, the resonator having a nonlinear crystal therein arranged to generate second-harmonic radiation from the fundamental radiation, and a variable polarization-rotator, located in the laser resonator between a mirror of the laser resonator and the optically nonlinear crystal and rotatable for varying the second-harmonic output of the crystal.

FIG. 4 schematically illustrates still another embodiment 70 of laser apparatus in accordance with the present invention. Laser 70 includes a continuous wave (CW), traveling-wave ring resonator 72 formed by mirrors $M_1$, $M_2$, $M_3$, and $M_4$. Fundamental radiation is generated by a solid-state gain-medium 22 located between mirrors $M_2$ and $M_3$. Mirrors $M_2$ and $M_3$ have reflection and transmission specifications similar to mirrors 18 and 20 of lasers 10, 11, and 60. Gain-medium 22 is end pumped through mirrors in a manner similar to the end-pumping of gain-medium 22 in lasers 10, 11, and 60. An optical diode 74 causes unidirectional circulation of fundamental radiation as indicated by arrows F.

An optically nonlinear crystal 34 is located in an arm of resonator 72 between mirrors $M_3$ and $M_4$ and arranged to generate second-harmonic radiation (2H). Mirror $M_4$ is highly reflective for fundamental radiation F and highly transmissive for 2H radiation and serves to deliver 2H radiation out of the resonator. Variable polarization-rotating arrangement 40 is located between crystal 34 and mirror $M_3$. 2H-output of the laser is monitored by sampling the 2H-output using beamsplitter 48 and detector 50 cooperative with controller as described above with reference to lasers 10, 11, and 60.

The present invention is described above with reference to lasers in which one or two optically nonlinear crystals are used to generate respectively second-harmonic or third-harmonic output radiation. Those skilled in the art, however, will recognize, without further detailed description or illustration, that the invention is applicable when two or more optically nonlinear crystals are used to provide fourth or higher harmonic radiation, or more. The application is applicable to sum-frequency mixing in general in one or more optically nonlinear crystals and also to difference frequency mixing using one or more optically nonlinear crystals. In difference frequency mixing two wavelengths are mixed in an optically nonlinear crystal to provide a wavelength longer than the two wavelengths mixed.

The invention is further applicable in systems wherein an optically nonlinear crystal is arranged for optical parametric conversion, such as an optical parametric oscillator (OPO). In such an apparatus, plane-polarized fundamental radiation is converted into two components (usually referred to as the signal and the idler) each having a different wavelength from that of the fundamental radiation. The sum of the frequencies of the signal and idler components is equal to the frequency of the fundamental radiation, i.e., the wavelengths of the signal and idler components are both longer than the fundamental wavelength.

Those skilled in the art will also recognize that while the present invention has been described in terms of generating harmonic radiation from radiation having a fundamental wavelength of 1064 nm delivered from a solid-state laser resonator, the invention is applicable to converting any fundamental wavelength transmissible by a polarization-rotating device from any kind of laser, provided that the fundamental radiation is plane-polarized. The invention is applicable however the gain-medium is pumped.

It is also possible, in theory at least, in any of the above described or similar embodiments of the invention, to omit the variable polarization rotating arrangement 40 and provide selectively variable rotation of one of the optically nonlinear crystals relative to the polarization orientation of fundamental radiation circulating in or delivered by a resonator. A disadvantage of this, however, is that this would result in a corresponding rotation of the polarization-plane of the harmonic output radiation in some cases. This could present problems in communicating with optical apparatus arranged to use the harmonic output for a particular application.

In summary, the present invention is described above in terms of a preferred and other embodiments. The invention is not limited, however, to the embodiments described and depicted. Rather, the invention is limited only by the claims appended hereto.

What is claimed is:

1. In laser apparatus including an optically nonlinear crystal arranged to receive plane-polarized radiation having a first wavelength and generate therefrom radiation having a second wavelength that is different from the first wavelength, a method of selectively adjusting the power of second-wavelength radiation generated to a desired level, comprising:
    measuring the power of the second wavelength radiation; and
    based on the results of the measuring step, selectively varying the orientation of the polarization-plane of the first-wavelength radiation with respect to the optically nonlinear crystal to obtain the desired power level.

2. The method of claim 1, wherein the second wavelength is a rational fraction of the first wavelength.

3. The method of claim 2, wherein the second wavelength is one-half of the first wavelength.

4. The method of claim 2, wherein the second-wavelength is one third of the first wavelength.

5. The method of claim 1, wherein the second wavelength is longer than the first wavelength.

6. The method of claim 1, wherein the selective variation of the orientation of the polarization-plane is accomplished by locating a variable polarization rotator in a path of the first-wavelength radiation to the optically nonlinear crystal and selectively rotating the polarization rotator to vary the orientation of the polarization-plane.

7. The method of claim 1, wherein the variable polarization rotator is a half-wave plate.

8. Optical apparatus, comprising:
    a laser resonator generating plane-polarized laser radiation having a fundamental wavelength;
    one or more optically nonlinear crystals arranged to generate plane-polarized radiation having a harmonic wavelength of the fundamental-wavelength radiation;
    a detector for measuring the power of the harmonic wavelength radiation;
    a polarization-rotating device arranged to selectively vary the orientation of the polarization-plane of any one of fundamental or harmonic-wavelength radiation with respect to any one of the one or more optically nonlinear crystals for varying the power of harmonic-wavelength radiation generated thereby; and a controller operating in response to the power measured by the detector and controlling the polarization rotating device to achieve the desired power level of the harmonic wavelength radiation.

9. The apparatus of claim 8, wherein there is only one optically nonlinear crystal, and that crystal is arranged to generate second-harmonic radiation from the fundamental-wavelength radiation.

10. The apparatus of claim 9, wherein the optically nonlinear crystal is located outside the laser resonator and the fundamental-wavelength radiation is delivered to the optically nonlinear crystal via a mirror of the laser resonator, and the polarization-rotating device is located in the path of fundamental-wavelength radiation delivered to the optically nonlinear crystal.

11. The apparatus of claim 9, wherein the polarization-rotating device and the optically nonlinear crystal are located within the laser resonator in the path of the fundamental-wavelength radiation generated by the laser resonator and circulating in the laser resonator.

12. The apparatus of claim 11, wherein the laser resonator is a traveling wave-laser resonator and the fundamental-wavelength radiation circulates in only one direction in the laser resonator.

13. The apparatus of claim 8, wherein there are first and second optically nonlinear crystals located outside the laser resonator, wherein the first optically nonlinear crystal receives fundamental-wavelength radiation delivered by the laser mirror and generates second-harmonic-wavelength radiation from a portion of that fundamental-wavelength radiation, and wherein the second optically nonlinear crystal mixes second-harmonic-wavelength and residual fundamental-wavelength radiation from the first optically nonlinear crystal to generate third-harmonic wavelength radiation.

14. The apparatus of claim 13, wherein the polarization-rotating device is located in the path of fundamental wavelength radiation delivered to the first optically nonlinear crystal for selectively varying the orientation of the polarization-plane of the fundamental-wavelength radiation delivered to the first optically nonlinear crystal.

15. The apparatus of claim 8, wherein the polarization-rotating device is a half-wave plate selectively rotatable about the path of plane-polarized-radiation entering any one of the one or more optically nonlinear crystals for varying the polarization orientation of that plane-polarized radiation with respect to the optically nonlinear crystal.

16. A laser system comprising:
a gain medium;
means for exciting the gain medium to generate fundamental laser radiation;
a non-linear crystal for converting fundamental laser radiation into a harmonic thereof;
a waveplate for modifying the polarization state of the fundamental laser radiation prior to entering the non-linear crystal;
means for adjusting the orientation of the waveplate with respect to the propagation axis of the laser radiation to vary the polarization state of the fundamental laser radiation in order to vary the conversion efficiency of the non-linear crystal and thus the power of the converted harmonic radiation;
a detector for measuring the power of the second harmonic radiation and generating output signals in response thereto; and
a controller operating in response to the output signals for controlling the means for adjusting the orientation of the waveplate to thereby control the power of the converted harmonic radiation.

17. A laser system as recited in claim 16, wherein the gain medium is located within a laser resonator and the non-linear crystal is located external to the laser resonator.

18. A laser system as recited in claim 16, wherein the gain medium and the non-linear crystal are located within a common laser resonator.

* * * * *